(12) United States Patent
McMillan, II et al.

(10) Patent No.: US 11,348,713 B2
(45) Date of Patent: May 31, 2022

(54) CONFIGURATION OF MAGNETS AND METHOD FOR COUPLING AN ACCESSORY TO AN ARTICLE OF CLOTHING

(71) Applicants: Leartis Jay McMillan, II, Secaucus, NJ (US); Haley Compton, Secaucus, NJ (US)

(72) Inventors: Leartis Jay McMillan, II, Secaucus, NJ (US); Haley Compton, Secaucus, NJ (US)

( * ) Notice: Subject to any disclaimer, the term of this patent is extended or adjusted under 35 U.S.C. 154(b) by 684 days.

(21) Appl. No.: 16/384,577

(22) Filed: Apr. 15, 2019

(65) Prior Publication Data
US 2020/0328771 A1    Oct. 15, 2020

(51) Int. Cl.
*H01F 7/02*        (2006.01)
*A45F 5/02*        (2006.01)
*H04B 1/3888*      (2015.01)

(52) U.S. Cl.
CPC .............. *H01F 7/0252* (2013.01); *A45F 5/02* (2013.01); *H01F 7/02* (2013.01); *H04B 1/3888* (2013.01)

(58) Field of Classification Search
CPC ......... H04B 1/3888; H04B 1/385; A45F 5/02; A45F 2200/0525; A45F 5/022; A45C 13/1069; H04M 1/04; H01F 7/00; H01F 7/0252

See application file for complete search history.

(56) References Cited

U.S. PATENT DOCUMENTS

| | | | | |
|---|---|---|---|---|
| 6,163,889 A * | 12/2000 | Tate | ..................... | A63B 57/353 |
| | | | | 2/209.13 |
| 6,779,199 B1 * | 8/2004 | O'Dea | ............. | A41D 19/01594 |
| | | | | 224/183 |
| 9,343,214 B2 * | 5/2016 | Mathieu | ..................... | A45F 5/02 |
| 9,763,510 B1 * | 9/2017 | Miner | ....................... | A45F 5/02 |
| 10,278,440 B2 * | 5/2019 | Horton | ..................... | A41B 1/10 |
| 2004/0173484 A1 * | 9/2004 | Bates | ........................ | B25H 3/04 |
| | | | | 206/349 |
| 2005/0097711 A1 * | 5/2005 | Halstead | .................. | A45C 1/06 |
| | | | | 24/303 |
| 2005/0102802 A1 * | 5/2005 | Sitbon | ................ | A45C 13/1069 |
| | | | | 24/303 |
| 2006/0032026 A1 * | 2/2006 | Schoening | ............... | A44B 6/00 |
| | | | | 2/303 |
| 2017/0035129 A1 * | 2/2017 | Srivastava | ............... | A41B 1/10 |

* cited by examiner

*Primary Examiner* — Mohamad A Musleh
(74) *Attorney, Agent, or Firm* — John Laurence

(57) ABSTRACT

A configuration of magnets for coupling an accessory to an article of clothing, including a first plurality of magnets arranged within a casing with an upper surface and a lower surface opposite the upper surface. Each of the first plurality of magnets having a first magnetic polarity and a second magnetic polarity opposite the first magnetic polarity. Each of the first plurality of magnets positioned within the casing with a minimum separation between each of the first plurality of magnets. Each of the first plurality of magnets oriented such that the first magnetic polarity emanates from the upper surface of the casing. An article of clothing including a portion in which the casing is embedded.

18 Claims, 6 Drawing Sheets

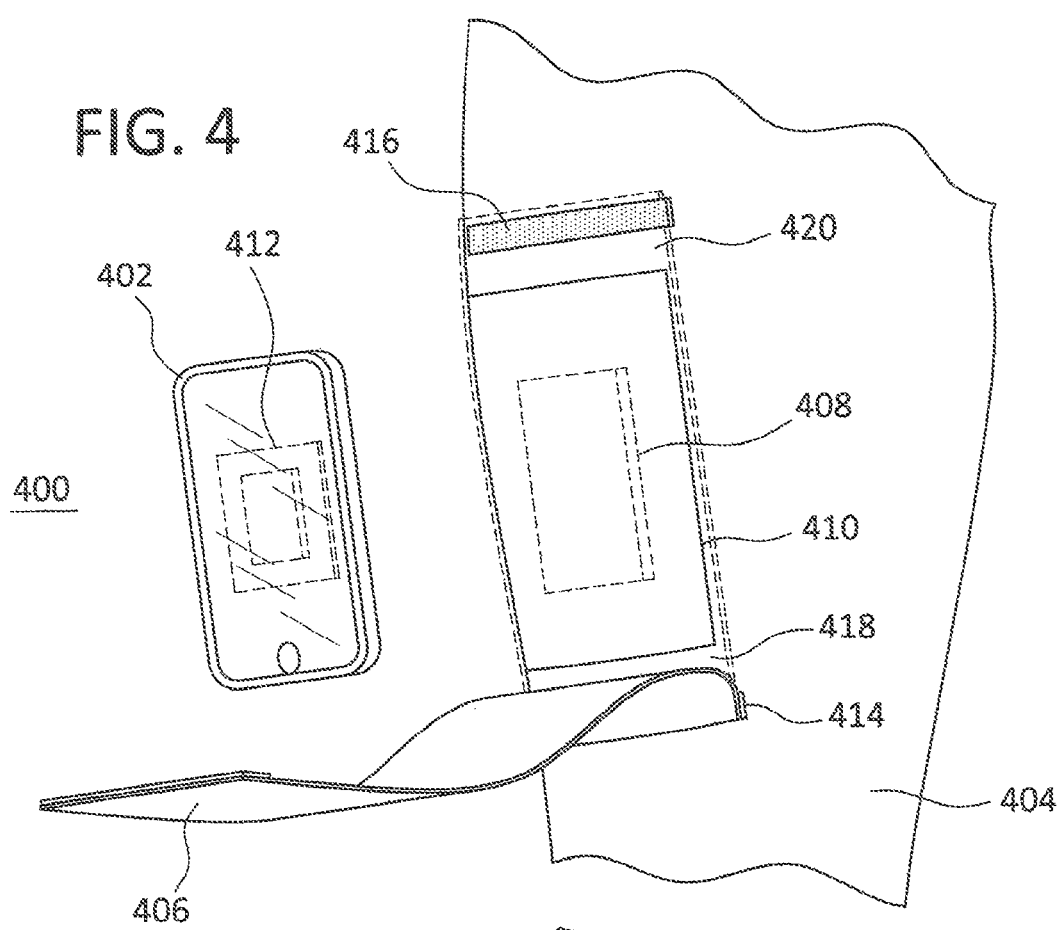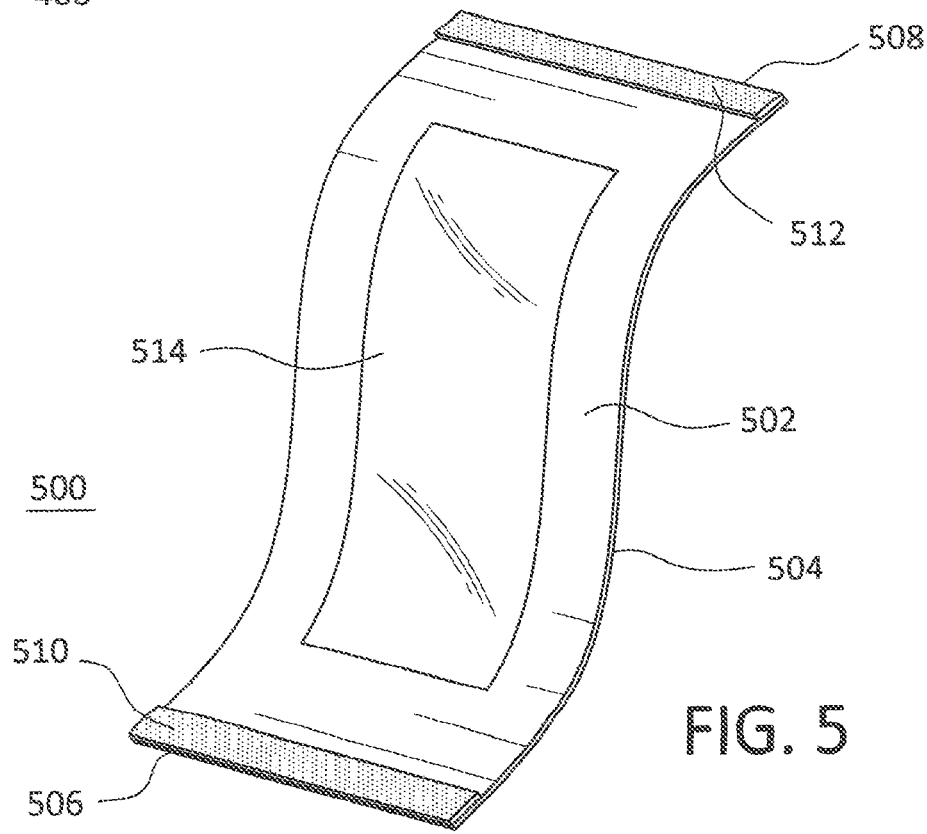

US 11,348,713 B2

CONFIGURATION OF MAGNETS AND METHOD FOR COUPLING AN ACCESSORY TO AN ARTICLE OF CLOTHING

FIELD

This application relates to a configuration of magnets interacting with an article of clothing and an accessory, and more particularly to a configuration of magnets and method for coupling an accessory to an article of clothing.

BACKGROUND

While the number and variety of portable devices used daily have increased significantly, the standard pocket that is generally used to carry these devices has itself not significantly changed to help increase the portability, use, and access of these portable devices.

The increase in the number and variety of portable devices has resulted in a need to carry and access any one of a variety of devices of differing sizes, widths, weights, and shapes. These portable devices nay include smartphones, flip phones, tablets, mpeg player, and other similar devices.

The fixed space within a standard pocket may be enough to accommodate while allowing for easy access to some types of portable devices. However, that same fixed space may not be enough to accommodate for the differing size, width, weight, and shape of other types of portable devices.

What is needed is an augmented pocket within an article clothing that is capable of accommodating and providing easy access to a large variety of portable devices, or accessories, of varying sizes, widths, weights, and shapes.

SUMMARY

In some embodiments, a configuration of magnets for holding an accessory to an article of clothing is provided. The configuration of magnets including a first plurality of magnets arranged within a casing with an upper surface and a lower surface opposite the upper surface. Each of the first plurality of magnets having a first magnetic polarity and a second magnetic polarity opposite the first magnetic polarity. Also, each of the first plurality of magnets positioned within the casing with a minimum horizontal separation and a minimum vertical separation between each of the first plurality of magnets. Lastly, each of the first plurality of magnets oriented such that the first magnetic polarity emanates from the upper surface of the casing and the second magnetic polarity emanates from the lower surface. The configuration of magnets further including an article of clothing including a portion in which the casing is embedded. Lastly, the configuration of magnets further including an accessory clip magnetically attracted to the first plurality of magnets.

In some embodiments, an article of clothing with a magnetic system is provided. The article of clothing including a plurality of magnets positioned within a casing having an upper surface and a lower surface opposite the upper surface, each of the plurality or magnets having a first magnetic pole and a second magnetic pole opposite the first magnetic pole. The article of clothing further including an article of clothing with a pocket in which the casing is removably inserted. The article of clothing wherein each the plurality of magnets is positioned within the casing as to maintains a minimum horizontal distance and a minimum vertical distance between each of the plurality of magnets. Lastly, the article of clothing wherein each of the plurality of magnets is oriented such that the first magnetic pole of each of the plurality of magnets emanates outward from the upper surface.

In some embodiments, a method of forming a configuration of magnets for holding an accessory to an article of clothing is provided. The method including providing a first plurality of magnets arranged within a casing with an upper surface and a lower surface opposite the upper surface. The method further including providing that each of the first plurality of magnets has a first magnetic polarity and a second magnetic polarity opposite the first magnetic polarity. The method further including providing that each of the first plurality of magnets is positioned within the casing with a minimum horizontal separation and a minimum vertical separation between each of the first plurality of magnets. The method further including providing that each of the first plurality of magnets is oriented such that the same first magnetic polarity emanates from the upper surface of the casing and that the same second magnetic polarity emanates from the lower surface. The method further including providing an article of clothing including a portion in which the casing is embedded. The method further including providing an accessory clip magnetically attracted to the first plurality of magnets.

Still, other aspects, features, and advantages of this disclosure may be readily apparent from the following detailed description, which illustrates by a number of example embodiments. This disclosure may also be capable of other and different embodiments, and its several details may be modified in various respects. Accordingly, the drawings and descriptions are to be regarded as illustrative, and not as restrictive.

BRIEF DESCRIPTION OF THE DRAWINGS

The drawings, described below, are for illustrative purposes only and are not necessarily drawn to scale. The drawings are net intended to limit the scope of the invention in any way. Wherever possible, the sane or like reference numbers are used throughout the drawings to refer to the same or like parts.

FIG. 4 illustrates a perspective view of a configuration of magnets for holding an accessory to an article of clothing including a shielding flap in accordance with the embodiments provided herein.

FIG. 5 illustrates a perspective view of a shielding flap in accordance with the embodiments provided herein.

DETAILED DESCRIPTION

As mentioned above, the embodiments provided herein relate to a configuration of magnets interacting with an article of clothing and an accessory, and more particularly to a configuration of magnets for coupling an accessory to an article of clothing.

The configuration of magnets of the embodiments provided herein preferably provides for an alternative to standard pockets that are traditionally provided within the articles of clothing, the traditional pockets used for carrying accessories.

In the embodiments provided herein, & plurality of magnets is embedded within a portion of an article of clothing, each of the magnets comprising the first plurality of magnets oriented within a flexible casing such that the same magnetic pole emanates outward from a portion of the article of clothing. Moreover, each of the magnets comprising the first plurality of magnets is arranged within the flexible casing such that the casing may easily flex and conform to the shape and movement of the article of clothing.

The first plurality of magnets may include ceramic magnets, neodymium magnets, samarium cobalt magnets, and flexible rubber magnets and other forms of magnets. The overall pull strength of the first plurality of magnets will vary depending on the weight, size, and shape of the magnets comprising the first plurality of magnets.

The accessory may include smart phones, digital music players, and keys. Other accessories may also be included while remaining within the scope of the embodiments provided herein.

An accessory clip is attached to the accessory that is to be carried. The accessory clip interacts magnetically with the first plurality of magnets to temporarily couple the accessory to the portion of the article of clothing.

The article of clothing may include such items as pants, shirts, T-shirts, and shorts. Other articles of clothing may also be included while remaining within the scope of the embodiments provided herein. The article of clothing may be made from natural fabrics, such as cotton, linen, wool, down, and rubber, as well as synthetic fabrics, such as polyester and nylon, and any other suitable equivalents.

Figure 1A:
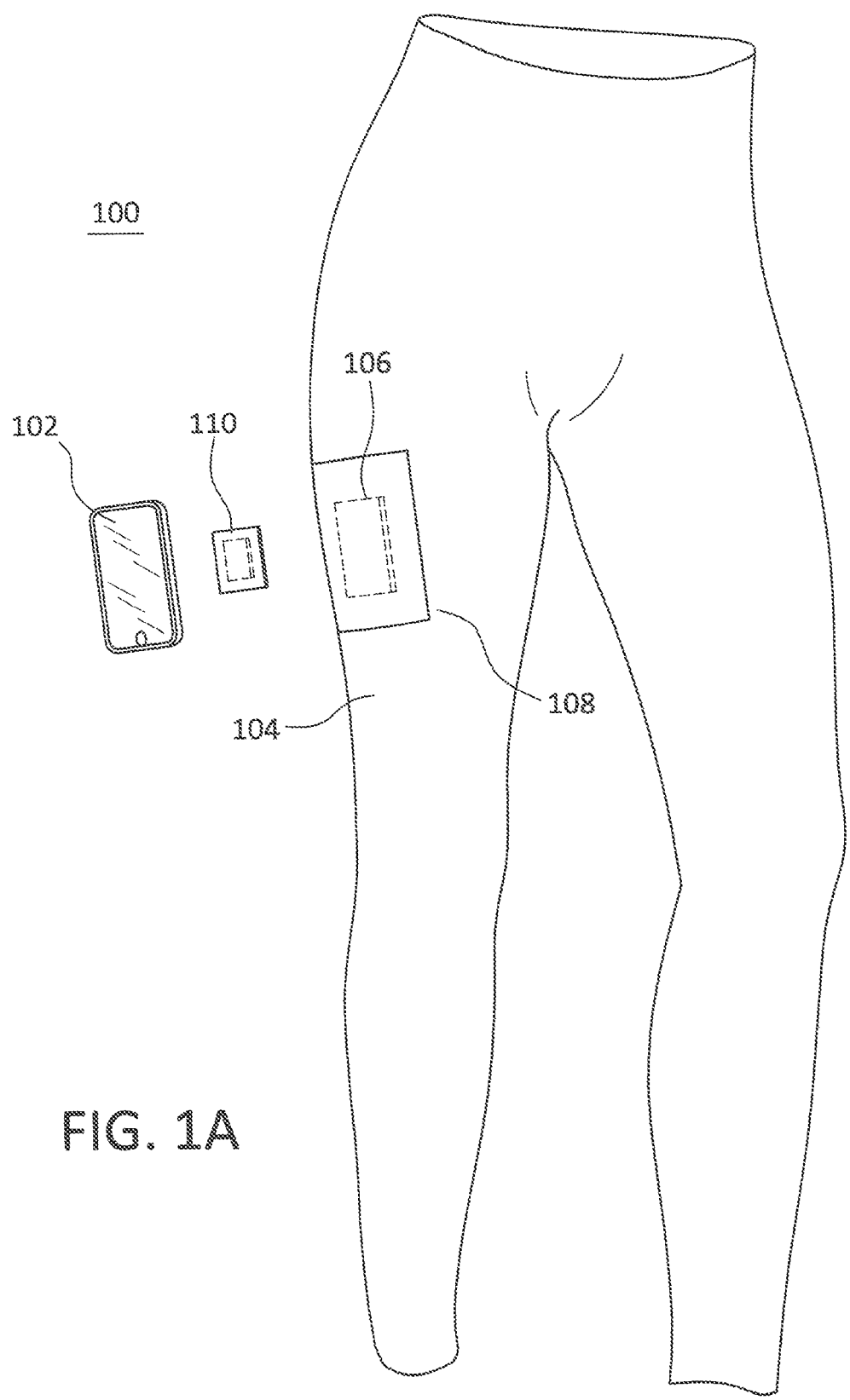
FIG. 1A illustrates a perspective view of a configuration of magnets for holding an accessory to an article of clothing in accordance with the embodiments provided herein.

FIG. 1A is a perspective view of a configuration of magnets 100 for holding an accessory 102 to an article of clothing 104 in accordance with the embodiments provided herein.

The configuration of magnets 100 includes a first plurality of magnets 106 within a portion 108 of the article of clothing 104. In an exemplary embodiment, the first plurality of magnets 106 may be permanently embedded within the portion 108 of the article of clothing 104. In the shown embodiment, the first plurality of magnets 106 is shown embedded within the outer right leg of a pair of elastic pants. However, the first plurality of magnets 106 may be embedded within another portion of the article of clothing 104 depending on the type of clothing. As an example, the first plurality of magnets 106 may be embedded within the outer left leg of the elastic pants or the right sleeve, left sleeve, or the frontal area of a shirt or T-shirt.

Alternatively, the first plurality of magnets 106 may be removably inserted within a standard pocket traditionally provided within the article of clothing 104.

The configuration of magnets 100 may further include an accessory clip 110 coupled to the accessory 102. The first plurality of magnets 106 magnetically interacting with the accessory clip 110 to removably couple the accessory 102 to the article of clothing 104.

In the shown embodiment, the article of clothing 104 is a pair of elastic training pants. However, as mentioned above, other types of clothing may be implemented including shorts, shirts, hats, and jackets.

Also, in the shown embodiment, the accessory 102 is a smartphone. However, other types of accessories 102 may be implemented including portable music players, keys, or any other types of devices that are to be transported while remaining easily accessible.

Figure 1B:
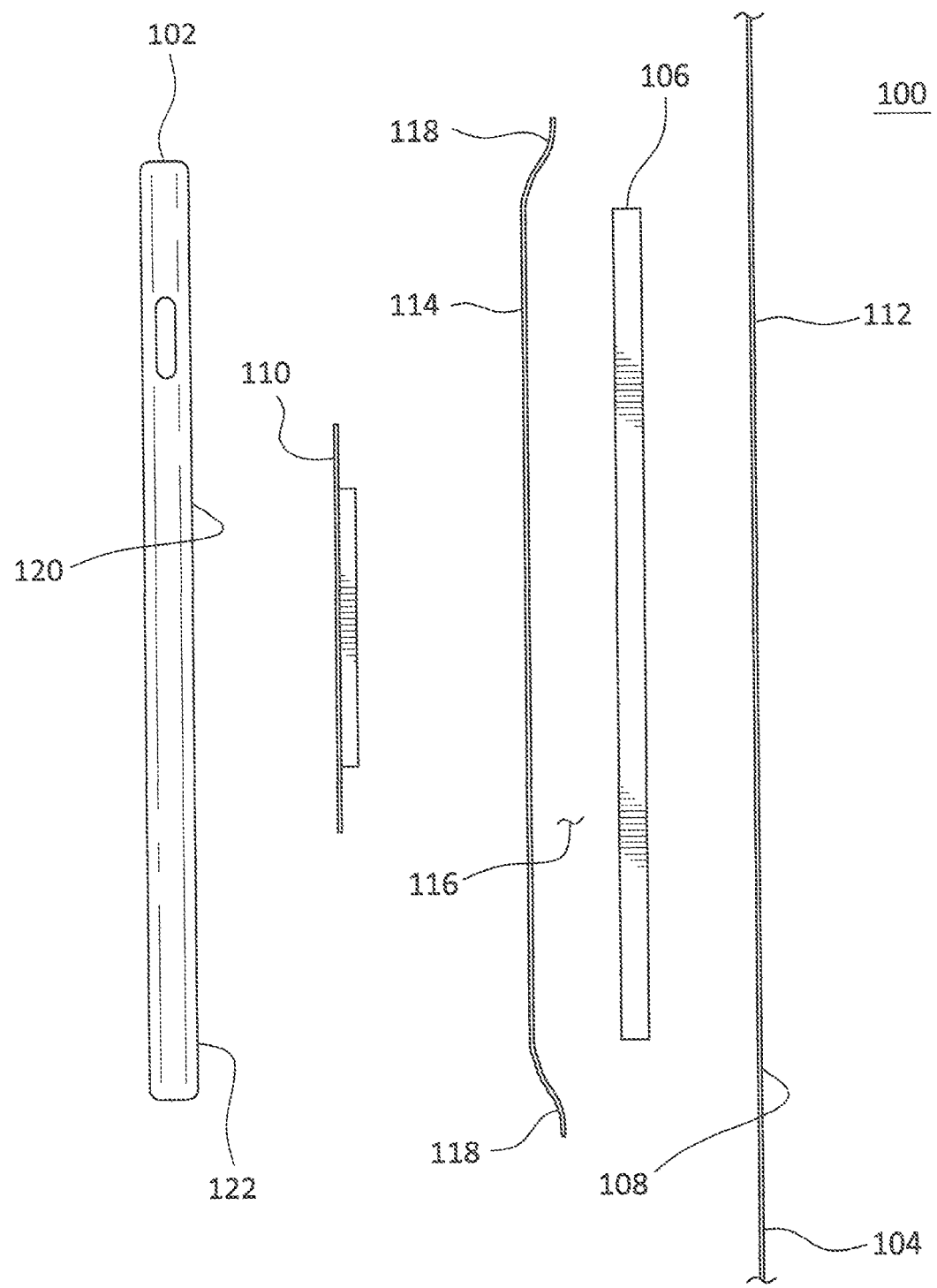
FIG. 1B illustrates an exploded view of the configuration of magnets for holding the accessory to the article of clothing in accordance with the embodiments provided herein.

FIG. 1B is an exploded view of the configuration of magnets 100 for holding the accessory 102 to the article of clothing 104 in accordance with the embodiments provided herein.

In the shown embodiment, the first plurality of magnets 106 is embedded within a portion 108 of the article of clothing 104. The portion 108 may include an inner layer 112 and an outer layer 114, the outer layer 114 attached to the inner layer 112 such as to define a space 116 within which the first plurality of magnets 106 is permanently embedded. The inner layer 112 maybe be defined as the portion 108 of the article of clothing 104 where the first plurality of magnets 106 is positioned. The outer layer 114 may be comprised of a first material that is the same or is different than a second material comprising the article of clothing 104. The outer layer 114 may be attached to the inner layer 112 at a perimeter 118 using any reasonable means known to one of ordinary skill in the art including threading, glue, buttons, and mechanical clips. The outer layer 114 may be attached to inner layer 112 in a manner to permanently secure the first plurality of magnets 106 within the portion 108 of the article of clothing 104.

As discussed above, in an alternate embodiment, the first plurality of magnets 106 may be removably inserted Into a standard pocket traditionally existing within the article of clothing 104.

The accessory clip 110 may couple to a portion 120 of an outer surface 122 of the accessory 102. The accessory clip 110 may be coupled to the outer surface 122 of the accessory 102 using any reasonable means known to a person of ordinary skill in the art for effectively adhering to a rigid surface including glue and mechanical clips.

The first plurality of magnets 106 and the accessory clip 110 magnetically interact with one another to removably couple the accessory 102 to the portion 108 on the article of clothing 104.

Figure 2:
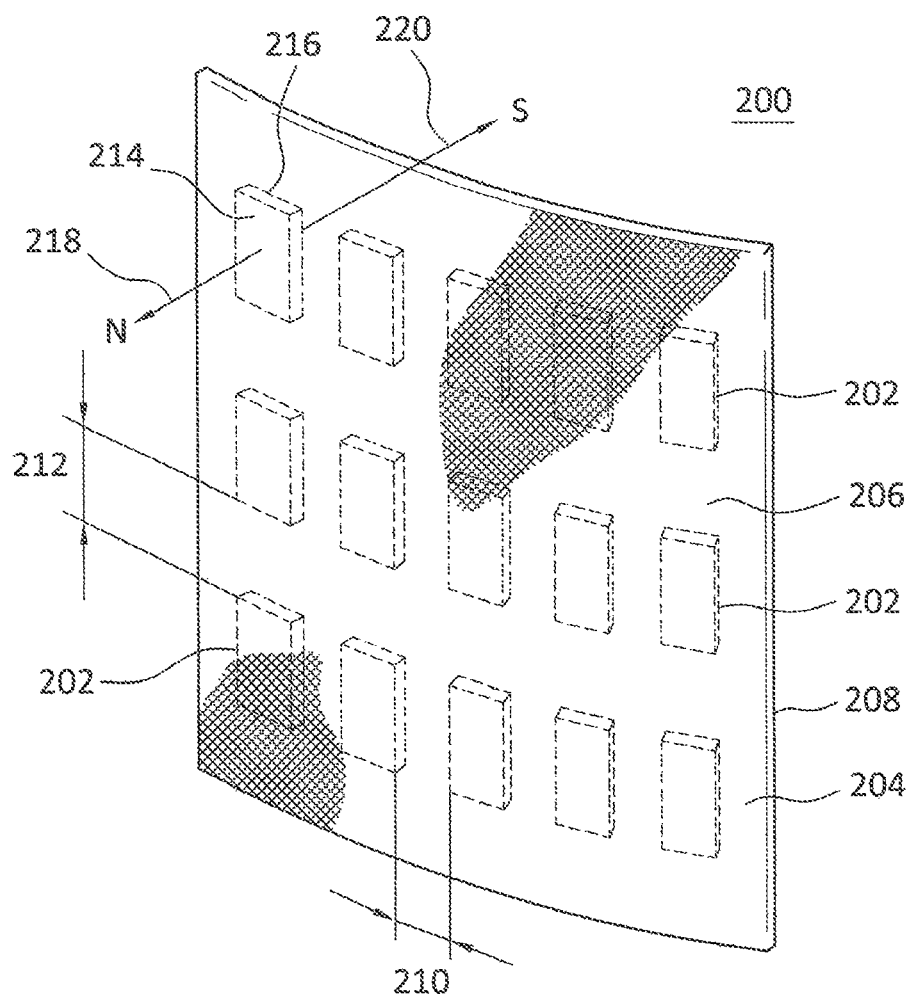
FIG. 2 illustrates a perspective view of a first plurality of magnets in accordance with the embodiments provided herein.

FIG. 2 is a perspective view of a first plurality of magnets 200 in accordance with the embodiments provided herein. Individual magnets 202 (only some labelled) comprising the first plurality of magnets 200 are each encased within a casing 204 may be planar shaped. The casing 204 may be comprised of one or more flexible materials and is designed to prevent movement of the individual magnets 202 within the casing 204. The flexible materials may include any one or more materials known to a person of ordinary skill in the art including plastic, canvas, and polymer coated polyester.

The casing 204 may include a front surface 206 and a back surface 208 opposite the front surface 206. The back surface 208 may lay flat against the inner layer 112 of the portion 108 of the article of clothing 104 while the front surface 206 may lay flat against the outer layer 114 of the portion 108 of the article of clothing 104 (See FIG. 1B). Alternatively, the casing 204 may be flipped such that the back surface 208 may lay flat against the outer layer 114 of the portion 108 of the article of clothing 104 while the front surface 206 may lay flat against the inner layer 112 of the portion 108 of the article of clothing 104.

The individual magnets 202 may be arranged and secured within the casing 204 in a manner that ensures a minimum horizontal separation 210 and a minimum vertical separation 212 between individual magnets 202. The minimum horizontal and vertical separations 210, 212 allowing for the casing 204 to easily flex and conform to the shape and movement of the article of clothing 104.

In the shown embodiment, the individual magnets 202 are in a rectangular grid configuration comprised of three rows and five columns for a total of fifteen individual magnets 202. However, other configurations may be implemented that also provide for a minimum horizontal separation 210 and a minimum vertical separation 212 between individual magnets 202 with a different total number of individual magnets 202. Specifically, the number of individual magnets 202 encased within the casing 204 may vary depending on a preferred size of the casing 204 and a required overall pull strength for the first plurality of magnets 200.

In an exemplary embodiment, both the minimum horizontal separation and the minimum vertical separation each may range from one inch to one and a half inches.

The individual magnets 202 may be planar shaped with an upper surface 214 and a lower surface 216 opposite the upper surface 214. The upper surface 214 has a first magnetic pole 218 and the lower surface 216 has a second magnetic pole 220 opposite the first magnetic pole 218.

The individual magnets 202 may be selected from the group consisting of ceramic magnets, neodymium magnets, samarium magnets, and flexible rubber magnets.

Each of the individual magnets 202 comprising the first plurality of magnets 200 may have a pull strength. Pull strength is a measure of the maximum strength, or holding power, that a magnet has before it is separated from another ferrous type material. The higher the pull strength, the stronger the magnet. Pull strength may be measured in pounds.

The total pull strength of the first plurality of magnets 200 may be equal to the cumulative pull strength of each of the individual magnets 202 comprising the first plurality of magnets 200. The pull strength of each of the individual magnets 202 may be the same across the first plurality of magnets 200. Alternatively, the pull strength of each of the individual magnets 202 may vary across the first plurality of magnets 200.

In one embodiment, each of the individual magnets 202 may have a pull strength equal to or greater than five pounds (5 lbs.)

The total pull strength of the first plurality of magnets 200 may be configured to be sufficiently strong to keep the accessory 102 attached to the article of clothing 104 while the article of clothing 104 flexes and moves.

The individual magnets 202 may each be oriented within the casing 204 such that the same upper surface 214 faces the front surface 206 of the casing 204. In this configuration, it follows that the same lower surface 216 of each of the individual magnets 202 faces the back surface 203 of the casing 204. As a result, the same first magnetic pole 218 from each of the individual magnets 202 emanates from the front surface 206 of the casing 204. Similarly, the same second magnetic pole 220 from each of the individual magnets 202 emanates from the back surface 208 of the casing 204.

In the shown embodiment, the first magnetic pole 218 emanating from the front surface 206 of the casing 204 is identified as the North Pole (N) and the second magnetic pole 220 emanating from the back surface 208 of the casing 204 is identified as the South Pole (S). However, each of the individual magnets 202 may be reoriented such that the identified South Pole (S) emanates from the front surface 206 and the identified North Pole (N) emanates from the back surface 208.

Moreover, the casing 204 itself may be oriented within the portion 108 such that either the first magnetic pole 218 from each of the individual magnets 202 or the second magnetic pole 220 from each of the individual magnets 202 emanates outward from the outer layer 114.

Similarly, in an alternate embodiment discussed above, the casing 204 may be removably inserted into a standard pocket traditionally existing within the article of clothing 104 such that either the first magnetic pole 218 from each of the individual magnets 202 or the second magnetic pole 220 from each of the individual magnets 202 emanates outward from the article of clothing 104.

Figure 3A:
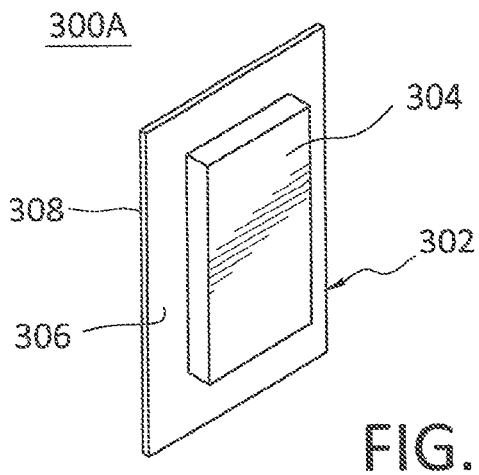
FIGS. 3A and 3B illustrate perspective views of embodiments of an accessory clip in accordance with the embodiments provided herein.

FIG. 3A is a perspective view of an accessory clip 300A in accordance with an embodiment provided herein.

The accessory clip 300A may include a body 302 and a solid metal piece 304. The body 302 may include an upper surface 306 and a lower surface 308 opposite the upper surface 306. The solid metal piece 304 may be comprised of one or more metal components that individually or in combination are attracted to a magnetic field.

The solid metal piece 304 may be coupled to the upper surface 306 of the body 302. The lower surface 308 of the body 302 may be coupled to the accessory 102 that is to be removably coupled to the article of clothing 104.

In the shown embodiment, the solid metal piece 304 is comprised of a single metal component coupled to the body 302.

However, the solid metal piece 304 may be comprised of multiple metal pieces coupled to the body 302, each of the metal pieces attracted to magnets and each having the same or different dimensions.

In this embodiment of the accessory clip 300A, the accessory 102 is coupled to the article of clothing 104 by the attraction of the solid metal piece 304 to either the first magnetic pole 218 or the second magnetic pole 220 emanating from the outer layer 114 of the portion 108 of the article of clothing 104.

Figure 3B:
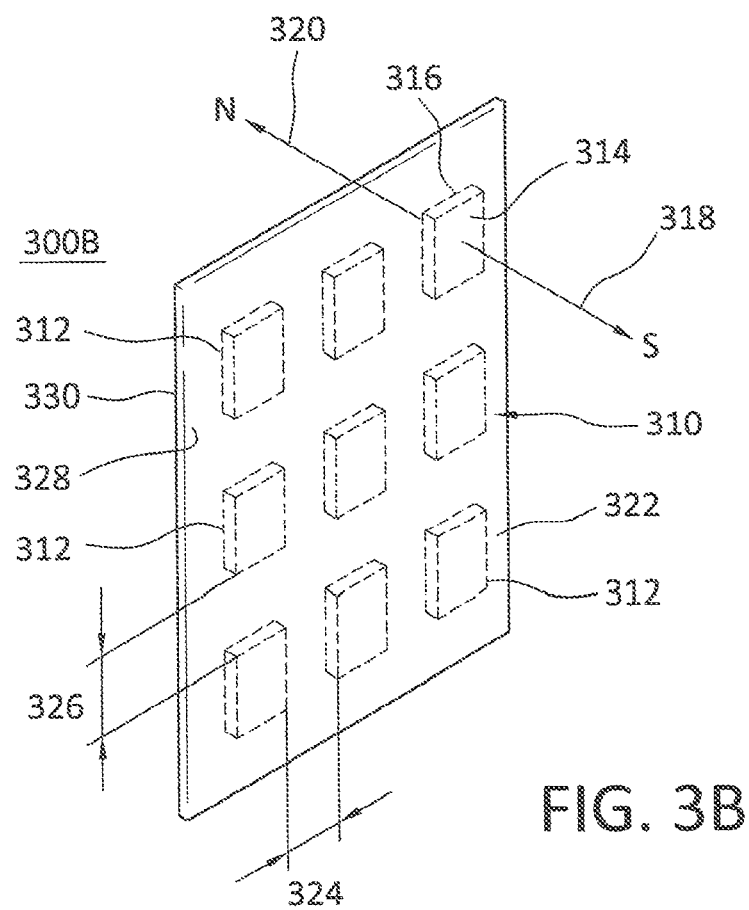

FIG. 3B is a perspective view of an accessory clip 300B in accordance with another embodiment provided herein. In this embodiment, the accessory slip 300B may be comprised of a second plurality of magnets 310.

Individual magnets 312 (only some labelled) comprising the second plurality of magnets 310 may be the same as the individual magnets 202 comprising the first plurality of magnets 200. Specifically, the individual magnets 312 comprising the second plurality of magnets 310 may be selected from the group consisting of ceramic magnets, neodymium magnets, samarium magnets, and flexible rubber magnets.

The individual magnets 312 may be planar shaped with an upper surface 314 and a lower surface 316 opposite the upper surface 314. The upper surface 314 may have a first magnetic pole 318 and the lower surface 316 may have a second magnetic pole 320 opposite the first magnetic pole 318.

In the shown embodiment, the first magnetic pole 318 is identified as a South Pole (S) and the second magnetic pole 320 is identified as a North Pole (N).

The individual magnets 312 may be arranged and secured within a casing 322. The casing 322 may be designed to prevent movement of the individual magnets 312 within the casing 322. Specifically, the individual magnets 312 may be arranged within the casing 322 as to ensure a minimum horizontal separation 324 and a minimum vertical separation 326 between the individual magnets 312. The minimum horizontal and vertical separations 324, 326 may generally match the minimum horizontal and vertical separations 210, 212 on the first plurality of magnets 200 (See FIG. 2).

The casing 322 may be comprised of one or more solid or flexible materials with a front surface 328 and a back surface 330 opposite the front surface 328. The back surface 330 may be designed to lay flat against the accessory 102. The front surface 328 may be designed to lay flat against the outer layer 114 of the portion 108 on the article of clothing 104.

Alternatively, the orientation of the casing 322 may be reversed such that the back surface 330 may be designed to lay flat against the outer layer 114 of the portion 108 of the accessory 102 and the front surface 328 may be designed to lay flat against, the accessory 102.

The individual magnets 312 are each oriented within the casing 322 such that the same upper surface 314 faces the front surface 328 of the casing 322. It follows that the same lower surface 316 of each of the individual magnets 312 faces the back surface 330 of the casing 322. As a result, the same first magnetic pole 318 from each of the individual magnets 312 emanates the front surface of the casing 322. Similarly, the same second magnetic pole 320 from each of the individual magnet 312 emanates from the back surface 330 of the casing 322.

In the shown embodiment, the accessory 102 is removably coupled to the article of clothing 104 by the magnetic interaction between the South Pole (S) emanating from the upper surface 328 of the accessory clip 300B and the opposite North Pole (N) emanating from the front surface 206 of the casing 204.

However, as described above, the casing 322 may foe re-oriented relative to the accessory 102 such that it is the North Pole (N) emanating from the back surface 330 of the accessory clip 300B that interacts with the opposite South Pole (S) emanating from the back surface 208 of the casing 204 to removably couple the accessory 102 to the article of clothing 104.

FIG. 4 is a perspective view of a configuration of magnets 400 for holding an accessory 402 to an article of clothing 404 with a shielding flap 406 in accordance with the embodiments provided herein.

The configuration of magnets 400 includes a first plurality of magnets 408 embedded within a portion 410 of the article of clothing 404. The configuration of magnets 400 also including an accessory clip 412 coupled to the accessory 402. The first plurality of magnets 408 magnetically interacting with the accessory clip 412 to removably couple the accessory 402 to the article of clothing 404.

The configuration of magnets 400 further including the shielding flap 406 coupled to the article of clothing 404, the shielding flap 406 capable of transitioning between an open position and a closed position (shown as dotted line).

The shielding flap 406 is designed to fully or partially cover the portion 410 when in the closed position and fully or partially exposing the portion 410 when in the open position.

The configuration of magnets 400 may further include a first fastening mechanism 414 and a second fastening mechanism 416. The first fastener mechanism 414 may be positioned proximate a first side 418 of the portion 410 and the second fastener mechanism 416 may be positioned proximate a second side 420 of the portion 410 opposite the first side 418. The first and second fastening mechanisms 414, 416 interacting with the shielding flap 406 to provide for the transition of the shielding flap 406 between the open position and the closed position.

FIG. 5 is a perspective view of the shielding flap 500 in accordance with the embodiments provided herein. The shielding flap 500 may be comprised of a flexible material with an inner surface 502 and an outer surface 504 opposite the inner surface 502.

The flexible material comprising the shielding flap 500 may be composed of a third material that may be the same as or different than the second material comprising the article of clothing 404.

The shielding flap 500 may include a first edge 506 and a second edge 508 opposite the first edge 506. The first edge 506 may include a first fastening mechanism 510 and the second edge 508 may include a second fastening mechanism 512.

The first fastening mechanism 510 may interact with the first fastening mechanism 414 on the article of clothing 404 to temporarily or permanently couple the first edge 506 to the article of clothing 404. Similarly, the second fastening mechanism 512 may interact with the second fastening mechanism 416 on the article of clothing 404 to temporarily couple the second edge 508 to the article of clothing 404.

The first and second fastening mechanisms 414, 416 coupled to the article of clothing 404 and the first and second fastening mechanisms 510, 512 coupled to the shielding flap 500 may each be any reasonable fastener type know to one of ordinary skill in the art including rippers, buttons, and Velcro.

The shielding flap 500 may further include a shielding film 514 embedded between the inner surface 502 and the outer surface 504 of the shielding flap 500. The shielding film 514 may be comprised of a tightly woven metal that is laminated to help make it flexible. The shielding film 514 may also include a ferromagnetic material. The shielding film 514 may be sized and shaped to generally match the size and shape of the shielding flap 500. With the shielding flap 500 in the closed position, the shielding film 514 functions to minimize the magnetic field emanating outward from the outer layer 114 of the portion 108 of the article of clothing 104. As a result, the first plurality of magnets 408 will no longer magnetically attract the accessory clip 412 to the article of clothing 404.

Figure 6:
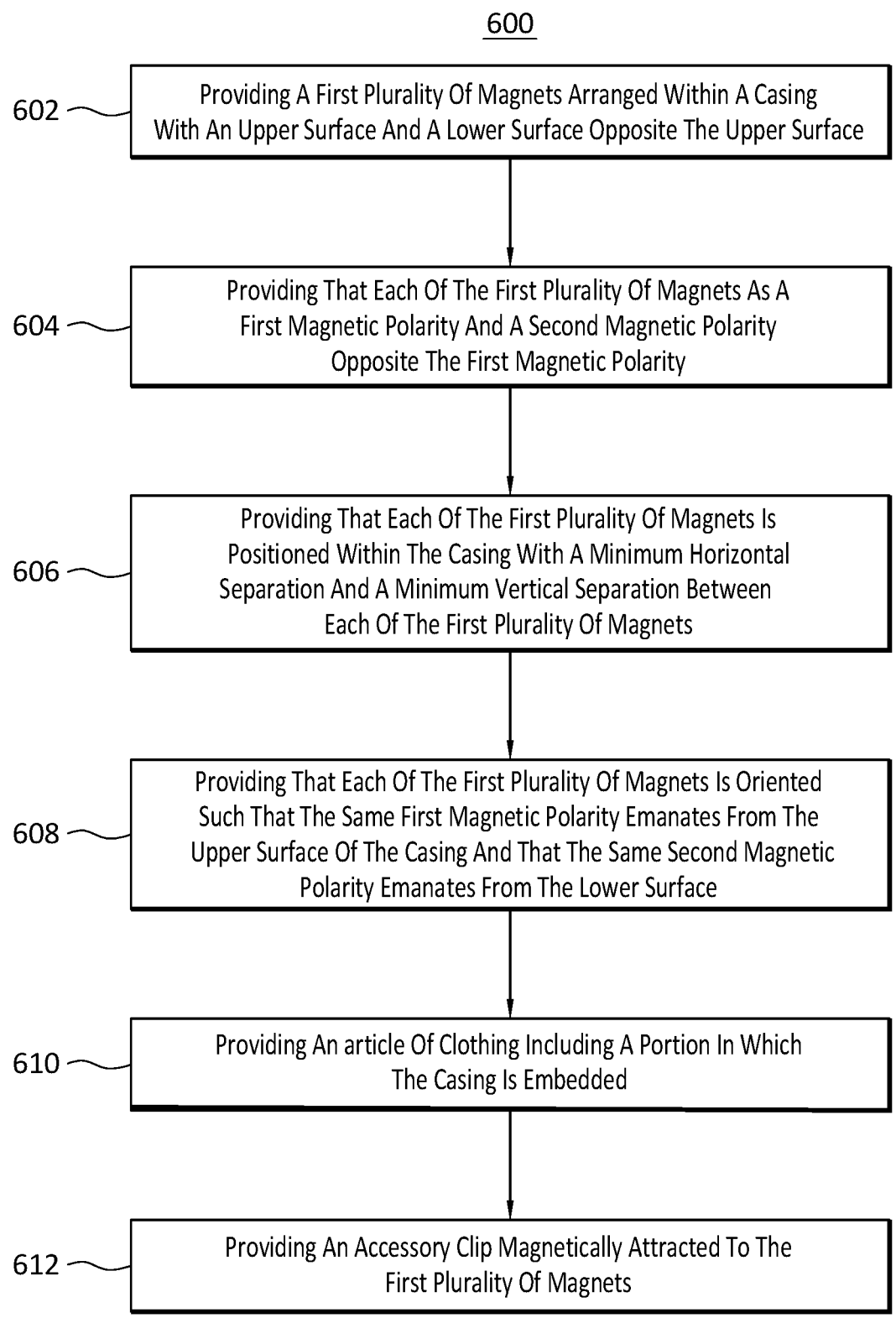
FIG. 6 illustrates a flowchart of a method of manufacturing a configuration of magnets for holding an accessory to an article of clothing in accordance with the embodiments provided herein.

FIG. 6 is a flowchart of a method 600 of manufacturing a configuration of magnets for holding an accessory to an article of clothing in accordance with the embodiments provided herein. The method may include, in 602, providing a first plurality of magnets arranged within a casing with an upper surface and a lower surface opposite the upper surface.

The method 600 may further include, in 604, providing that each of the first plurality of magnets has a first magnetic polarity and a second magnetic polarity opposite the first magnetic polarity.

The method 600 may further include, in 606, providing that each of the first plurality of magnets is positioned within the casing with a minimum horizontal separation and a minimum vertical separation between each of the first plurality of magnets.

The method 600 may further include, in 608, providing that each of the first plurality of magnets is oriented such that the same first magnetic polarity emanates from the upper surface of the casing and that the same second magnetic polarity emanates from the lower surface.

The method 600 may further include, in 610, providing an article of clothing including a portion in which the casing is embedded.

Lastly, the method 600 further includes, in 612, providing an accessory clip magnetically attracted to the first plurality of magnets.

The foregoing description discloses only example embodiments. Modifications of the above-disclosed assemblies and methods which fall within the scope of this disclosure will be readily apparent to those of ordinary skill in the art. For example, although the examples discussed above are illustrated for dry-type transformers, other embodiments in accordance with this disclosure can be implemented for other devices. This disclosure is not intended to limit the invention to the particular assemblies and/or methods disclosed, but, to the contrary, the intention is to cover all modifications, equivalents, and alternatives falling within the scope of the claims.

What is claimed is:

1. A configuration of magnets for coupling an accessory to an article of clothing, comprising:
    a first plurality of magnets arranged within a casing with an upper surface and a lower surface opposite the upper surface;
    each of the first plurality of magnets having a first magnetic polarity and a second magnetic polarity opposite the first magnetic polarity;
    each of the first plurality of magnets positioned within the casing with a minimum horizontal separation and a minimum vertical separation between each of the first plurality of magnets;
    each of the first plurality of magnets oriented such that the first magnetic polarity emanates from the upper surface of the casing and the second magnetic polarity emanates from the lower surface;
    the article of clothing including a portion in which the casing is embedded;
    an accessory clip magnetically attracted to the first plurality of magnets;
    a shielding flap coupled to the article of clothing, the shielding flap transitioning between a closed position in which the portion of the article of clothing is at least partially covered and an open position in which the portion of the article of clothing is fully exposed; and
    a shielding film embedded within the shielding flap.

2. The configuration of magnets of claim 1 wherein the accessory clip is comprised of one or more solid pieces of metal that are magnetically attracted to magnets.

3. The configuration of magnets of claim 1 wherein the accessory clip is comprised of a second plurality of magnets;
    each of the second plurality of magnets having a first magnetic polarity and a second magnetic polarity opposite the first magnetic polarity; and
    each of the second plurality of magnets oriented such that the second magnetic polarity of each of the second plurality of magnets emanates outward from an outer surface of the accessory clip.

4. The configuration of magnets of claim 3 wherein the accessory clip is encased within a silicone casing.

5. The configuration of magnets of claim 1 wherein the shielding film is comprised of a ferromagnetic material.

6. The configuration of magnets of claim 1 wherein the shielding flap is comprised of a first material and the article of clothing is comprised of a second material; and
    wherein the first material is the same as the second material.

7. The configuration of magnets of claim 1 wherein the first plurality of magnets is encased within a polymer coated polyester casing.

8. The configuration of magnets of claim 1 wherein the article of clothing comprises pants.

9. The configuration of magnets of claim 1 wherein the article of clothing comprises shirts.

10. The configuration of magnets of claim 1 wherein the article of clothing comprises hats.

11. The configuration of magnets of claim 1 wherein the first plurality of magnets is selected from the group consisting of ceramic magnets, neodymium magnets, samarium magnets, and flexible rubber magnets.

12. An article of clothing with a magnetic system, comprising:
    a plurality of magnets positioned within a casing having an upper surface and a lower surface opposite the upper surface, each of the plurality of magnets having a first magnetic pole and a second magnetic pole opposite the first magnetic pole;
    the article of clothing with a pocket in which the casing is removably inserted;
    a shielding flap coupled to the article of clothing, the shielding flap transitioning between a closed position in which the portion of the article of clothing is at least partially covered and an open position in which the portion of the article of clothing is fully exposed;
    a shielding film embedded within the shielding flap;
    wherein each the plurality of magnets is positioned within the casing as to maintain a minimum horizontal distance and a minimum vertical distance between each of the plurality of magnets; and
    wherein each of the plurality of magnets is oriented such that the first magnetic pole of each of the plurality of magnets emanates outward from the upper surface.

13. The article of clothing of claim 12 wherein the article of clothing is comprised of pants.

14. The article of clothing of claim 12 wherein the article of clothing is comprised of shirts.

15. The article of clothing of claim 12 wherein the article of clothing is comprised of hats.

16. The article of clothing of claim 12 wherein the plurality of magnets is selected from the group consisting of ceramic magnets, neodymium magnets, samarium magnets, and flexible rubber magnets.

17. The article of clothing of claim 12 wherein the casing is a polymer coated polyester casing.

18. A method of forming a configuration of magnets for holding an accessory to an article of clothing, comprising:
    providing a first plurality of magnets arranged within a casing with an upper surface and a lower surface opposite the upper surface;
    providing that each of the first plurality of magnets has a first magnetic polarity and a second magnetic polarity opposite the first magnetic polarity;
    providing that each of the first plurality of magnets is positioned within the casing with a minimum horizontal separation and a minimum vertical separation between each of the first plurality of magnets;
    providing that each of the first plurality of magnets is oriented such that the same first magnetic polarity emanates from the upper surface of the casing and that the same second magnetic polarity emanates from the lower surface;
    providing the article of clothing including a portion in which the casing is embedded;
    providing an accessory clip magnetically attracted to the first plurality of magnets;
    providing a shielding flap coupled to the article of clothing, the shielding flap transitioning between a closed position in which the portion of the article of clothing is at least partially covered and an open position in which the portion of the article of clothing is fully exposed; and providing a shielding film embedded within the shielding flap.

\* \* \* \* \*